(12) United States Patent
Uchida (10) Patent No.: US 6,301,897 B1
(45) Date of Patent: Oct. 16, 2001

(54) GAS TURBINE SUCTION AIR-COOLING SYSTEM

(75) Inventor: Shuichiro Uchida, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/551,205

(22) Filed: Apr. 17, 2000

Related U.S. Application Data (62) Division of application No. 09/036,040, filed on Mar. 6, 1998, now abandoned.

(30) Foreign Application Priority Data

Mar. 19, 1997 (JP) .................................................. 9-066074

(51) Int. Cl.⁷ ...................................................... F02C 1/00
(52) U.S. Cl. ............................................................ 60/728
(58) Field of Search ............................... 60/728; 415/175, 415/176

(56) References Cited

U.S. PATENT DOCUMENTS 5,444,971 * 8/1995 Hollenberger ....................... 60/39.02

FOREIGN PATENT DOCUMENTS

WO 97/09578    3/1997 (WO) .

* cited by examiner

Primary Examiner—Charles G. Freay
Assistant Examiner—Ehud Gartenberg
(74) Attorney, Agent, or Firm—Antonelli, Terry, Stout & Kraus, LLP (57) ABSTRACT

A gas turbine suction air cooling system includes a gas turbine, a suction air cooler for cooling the outside air to be drawn into the gas turbine, an air-cooling coil for feeding chilled water so as to cool the outside air drawn into the suction air cooler, and absorption chillers for feeding the chilled water to the air-cooling coil. The air-cooling coil is divided into a plurality of coil lines, and the air-cooling coil, disposed closest to the outside air, is connected to the absorption chiller for feeding the chilled water of highest temperature, and the other air-cooling coil, disposed closest to the gas turbine, is connected to the absorption chiller for feeding the chilled water of lowest temperature. The system having such as a construction can be made small in size and high in efficiency.

1 Claim, 7 Drawing Sheets

GAS TURBINE SUCTION AIR-COOLING SYSTEM

This is a divisional application of U.S. Ser. No. 09/036,040, filed Mar. 6, 1998, now abandoned.

BACKGROUND OF THE INVENTION

1. Field of the Invention

This invention relates to a gas turbine suction air-cooling system for cooling the air to be drawn into a gas turbine.

2. Description of the Related Art

Generally, a gas turbine suction air-cooling coil is formed as a single line, and therefore chilled water of a single temperature is supplied to the suction air-cooling coil so as to cool the suction air.

Such a construction is disclosed, for example, in Japanese Patent Unexamined Publication No. 2-78736.

Recently, in view of an advantage that waste heat of a gas turbine can be used as a drive source, countermeasures for dealing with a power consumption peak in the summer season, and the protection of the earth environment, absorption chillers have been more and more used as a source of supply of chilled water for cooling suction air in order to enhance the efficiency of the gas turbine. However, an absorption chiller uses water as a heating medium therein, and the operation in the chiller is effected at a pressure below the atmospheric pressure, and therefore, generally, the absorption chiller is larger in size than a mechanical-type chiller, and therefore has been required to be formed into a compact design, and also a higher efficiency of the overall system has been required. Furthermore, an air cooler itself has been eagerly required to have a compact design.

SUMMARY OF THE INVENTION

It is an object of this invention to provide a gas turbine suction air cooling system which has a compact design, and achieves a high efficiency.

According to one aspect of the present invention, there is provided a gas turbine suction air cooling system comprising a gas turbine, a suction air cooler for cooling the outside air to be drawn into the gas turbine, an air-cooling coil for feeding chilled water so as to cool the outside air drawn into the suction air cooler, and absorption chillers for feeding the chilled water to the air-cooling coil; in which the air-cooling coil is divided into a plurality of coil lines; and the air-cooling coil line, disposed closest to the outside air, is connected to the absorption chiller for feeding the chilled water of highest temperature, whereas the other air-cooling coil line, disposed closest to the gas turbine, is connected to that absorption chiller for feeding the chilled water of lowest temperature.

According to another aspect of the invention, there is provided a gas turbine suction air cooling system comprising a gas turbine, a suction air cooler for cooling the outside air to be drawn into the gas turbine, an air-cooling coil for feeding chilled water so as to cool the outside air drawn into the suction air cooler, absorption chillers for feeding the chilled water to the air-cooling coil, and means for feeding chilled water to absorbers and condensers of the absorption chillers; in which the air-cooling coil is divided into a plurality of air-cooling coil lines; and the air-cooling coil line, disposed closest to the outside air, is connected to the absorption chiller for feeding the chilled water of highest temperature, whereas the other air-cooling coil line, disposed closest to the gas turbine, is connected to that absorption chiller for feeding the chilled water of lowest temperature; and the chilled water is caused to flow in series to the absorption chiller for feeding the chilled water of the lowest temperature and the absorption chiller for feeding the chilled water of the highest temperature.

According to a further aspect of the invention, there is provided a gas turbine suction air cooling system comprising a gas turbine, a suction air cooler for cooling the outside air to be drawn into the gas turbine, an air-cooling coil for feeding chilled water so as to cool the outside air drawn into the suction air cooler, absorption chillers for feeding the chilled water to the air-cooling coil, and means for feeding chilled water to absorbers and condensers of the absorption chillers; in which the air-cooling coil is divided into a plurality of air-cooling coil lines; and the air-cooling coil line, disposed closest to the outside air, is connected to that absorption chiller for feeding the chilled water of highest temperature, whereas the other air-cooling coil line, disposed closest to the gas turbine, is connected to the absorption chiller for feeding the chilled water of lowest temperature; and the chilled water is caused to flow in parallel to the absorption chiller for feeding the chilled water of the lowest temperature and the absorption chiller for feeding the chilled water of the highest temperature.

With the above construction, the following operation is achieved.

The gas turbine suction air-cooling coil is divided into a plurality of (for example, two) coil lines, and the absorption chiller for supplying higher-temperature cooling chilled water (for example, of 9° C.) is connected to the coil line disposed close to the outside air, whereas the absorption chiller for supplying lower-temperature cooling chilled water (for example, of 6° C.) is connected to the coil line disposed close to the suction air of the gas turbine. With this construction, an evaporation temperature within an evaporator of the absorption chiller (which feeds the higher-temperature chilled water), connected to the coil line disposed close to the outside air, is higher than an evaporation temperature of an evaporator of the absorption chiller (which feeds the lower-temperature chilled water) connected to the coil line disposed close to the suction air of the gas turbine, and therefore a temperature difference, required for absorbing heat, is smaller in the former absorption chiller. Therefore, the former absorption chiller can be made smaller in size and higher in efficiency than the latter absorption chiller connected to the coil disposed close to the suction air of the gas turbine.

The suction air-cooling coil is divided into a plurality of coil lines, and the cooling chilled water of higher temperature is fed to the coil line disposed at the air inlet side (i.e, the higher-temperature side) whereas the cooling chilled water of lower temperature is fed to the coil line disposed at the air outlet side (i.e., the lower-temperature side), and by doing so, the heat exchange between the air and the cooling chilled water can be effected in a counterflow manner, and therefore the overall construction of the cooling coil can be made small.

In the present invention, a predetermined amount of air is cooled to a predetermined temperature, using the suction air-cooling coil and the chiller each of which is divided into not less than two, and with this construction, the suction air cooling system of the invention can be reduced in overall construction, and can achieve a higher efficiency as compared with the type of system in which one coil and one chiller are used.

DESCRIPTION OF THE PREFERRED EMBODIMENTS

A first embodiment of the present invention will now be described with reference to FIGS. 1 and 2.

Figure 1:
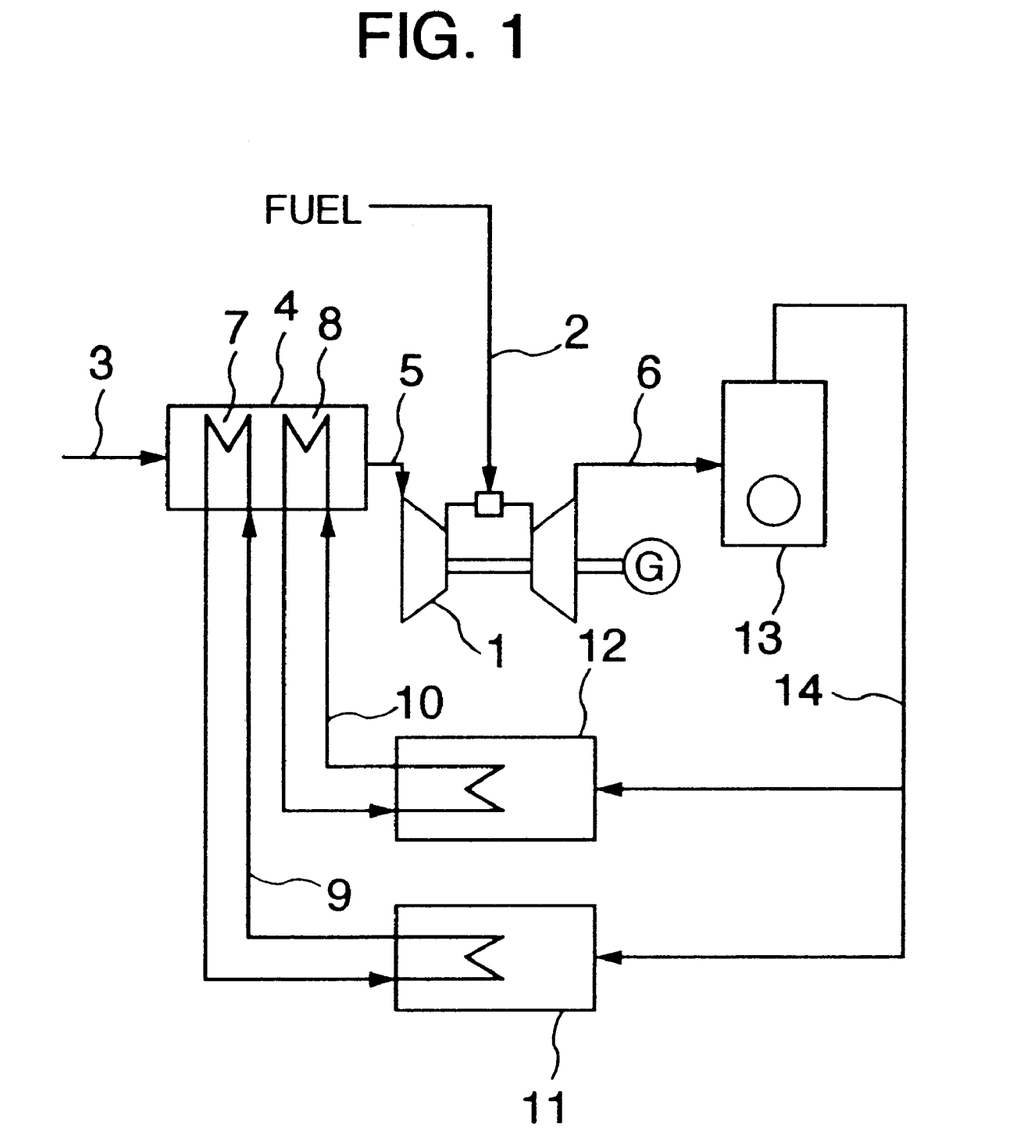
FIG. 1 is a system diagram of a gas turbine suction air cooling system according to a first embodiment of the present invention.

FIG. 1 is an overall system diagram of a gas turbine suction air cooling system. Fuel 2 is supplied to a gas turbine 1, and the outside air (ambient air) 3 is drawn into a suction air cooler 4. The cooled air 5, decreased in temperature when passed through the suction air cooler 4, assists in the combustion of the fuel 2, and becomes combustion exhaust gas 6. An internal coil of the suction air cooler 4 is divided into two lines, i.e., two coils, and an absorption chiller 11 for supplying higher-temperature cooling chilled water 9, for example, of 9° C. is connected to the coil 7 disposed close to the outside air 3, whereas an absorption chiller 12 for supplying lower-temperature cooling chilled water 10, for example, of 6° C. is connected to the coil 8 disposed close to the suction air 5 of the gas turbine.

The exhaust gas 6 from the gas turbine 1 is fed to a waste heat boiler 13, and steam 14, produced in the boiler 13, is used as a drive source for the absorption chillers 11 and 12.

Figure 2:
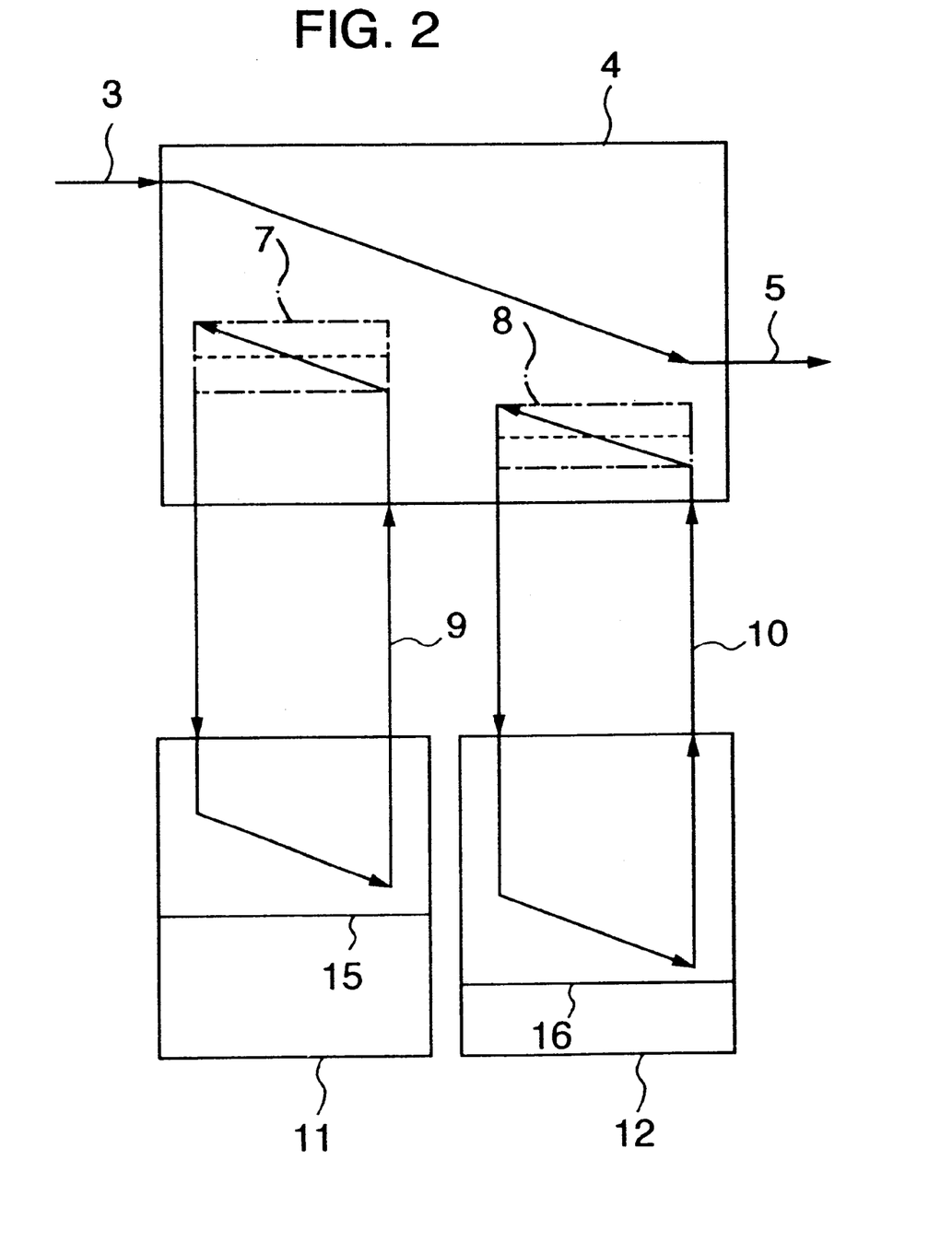
FIG. 2 is a diagram showing temperature conditions of the embodiment of FIG. 1.

FIG. 2 shows temperature conditions within the suction air cooler 4 and the absorption chillers 11 and 12.

The coil within the suction air cooler 4 is divided into the two lines, and by doing so, the heat exchange between the air and the cooling chilled water is effected in a counterflow manner, and the overall construction of the coil can be made small. And besides, an evaporation temperature within an evaporator of the absorption chiller 11, connected to the coil 7 disposed close to the outside air 3, is higher than an evaporation temperature 16 in an evaporator of the absorption chiller 12 connected to the coil 8 disposed close to the suction air 5 of the gas turbine 1, and therefore a temperature difference, required for absorbing heat, is smaller in the chiller 11. Therefore, the overall size of the chiller can be made small, and the efficiency thereof can be further enhanced.

Next, a second embodiment of the invention will be described with reference to FIGS. 3 and 4.

Figure 3:
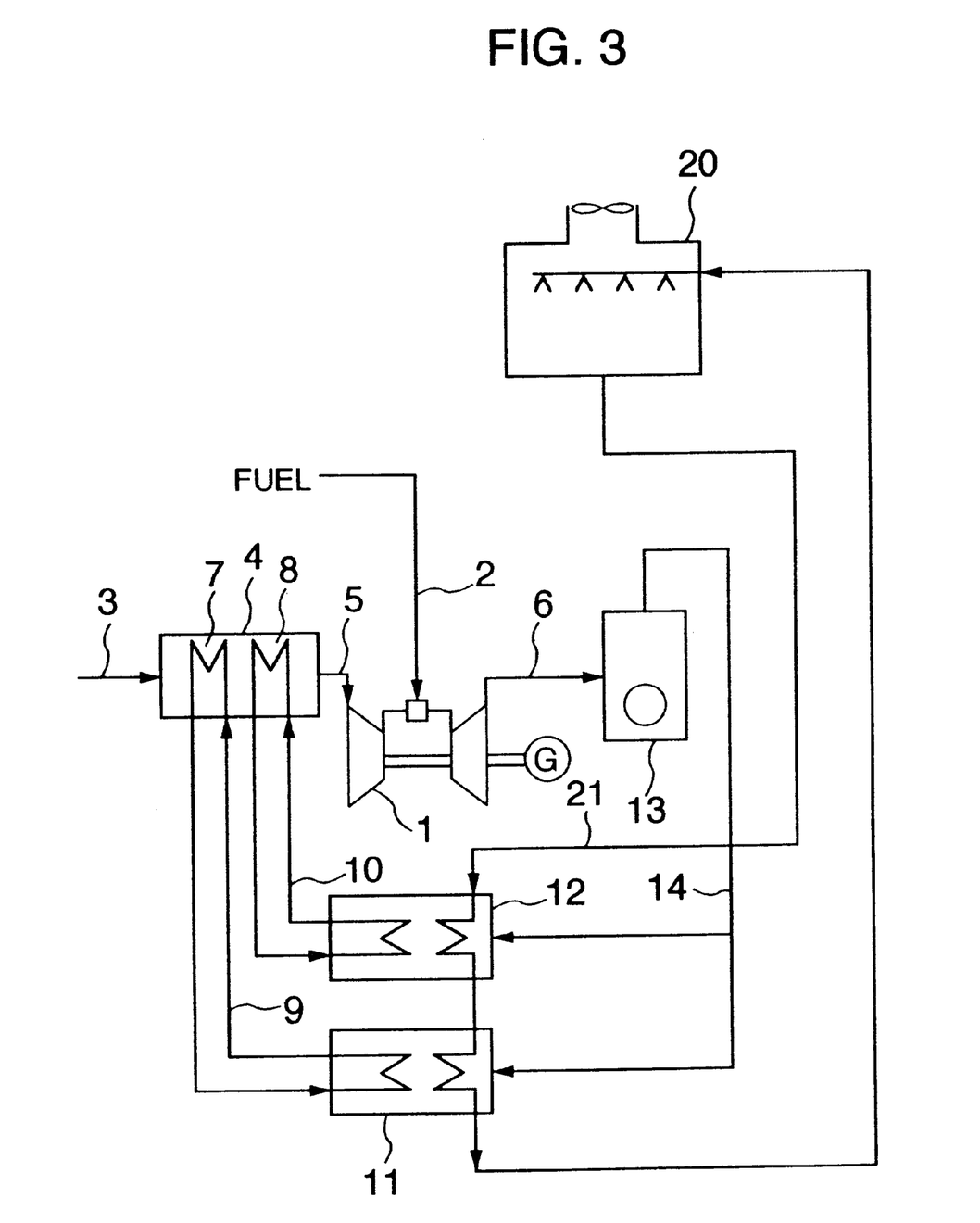
FIG. 3 is a system diagram of a gas turbine suction air cooling system according to a second embodiment of the invention.

FIG. 3 is an overall system diagram of a gas turbine suction air cooling system. Fuel 2 is supplied to a gas turbine 1, and the outside air 3 is drawn into a suction air cooler 4. The cooled air 5, decreased in temperature when passed through the suction air cooler 4, assists in the combustion of the fuel 2, and becomes combustion exhaust gas 6. An internal coil of the suction air cooler 4 is divided into two lines, and an absorption chiller 11 for supplying higher-temperature cooling chilled water 9, for example, of 9° C. is connected to the coil 7 disposed close to the outside air 3, whereas an absorption chiller 12 for supplying lower-temperature cooling chilled water 10, for example, of 6° C. is connected to the coil 8 disposed close to the suction air 5 of the gas turbine.

The exhaust gas 6 from the gas turbine 1 is fed to a waste heat boiler 13, and steam 14, produced in the boiler 13, is used as a drive source for the absorption chillers 11 and 12. Cooling water 21 for the chillers, decreased in temperature when passed through a cooling tower 20, is first fed to the absorption chiller 12 for supplying the cooling chilled water 10 of 6° C., and then is fed to the absorption chiller 11 for supplying the cooling chilled water 9 of 9° C.

Figure 4:
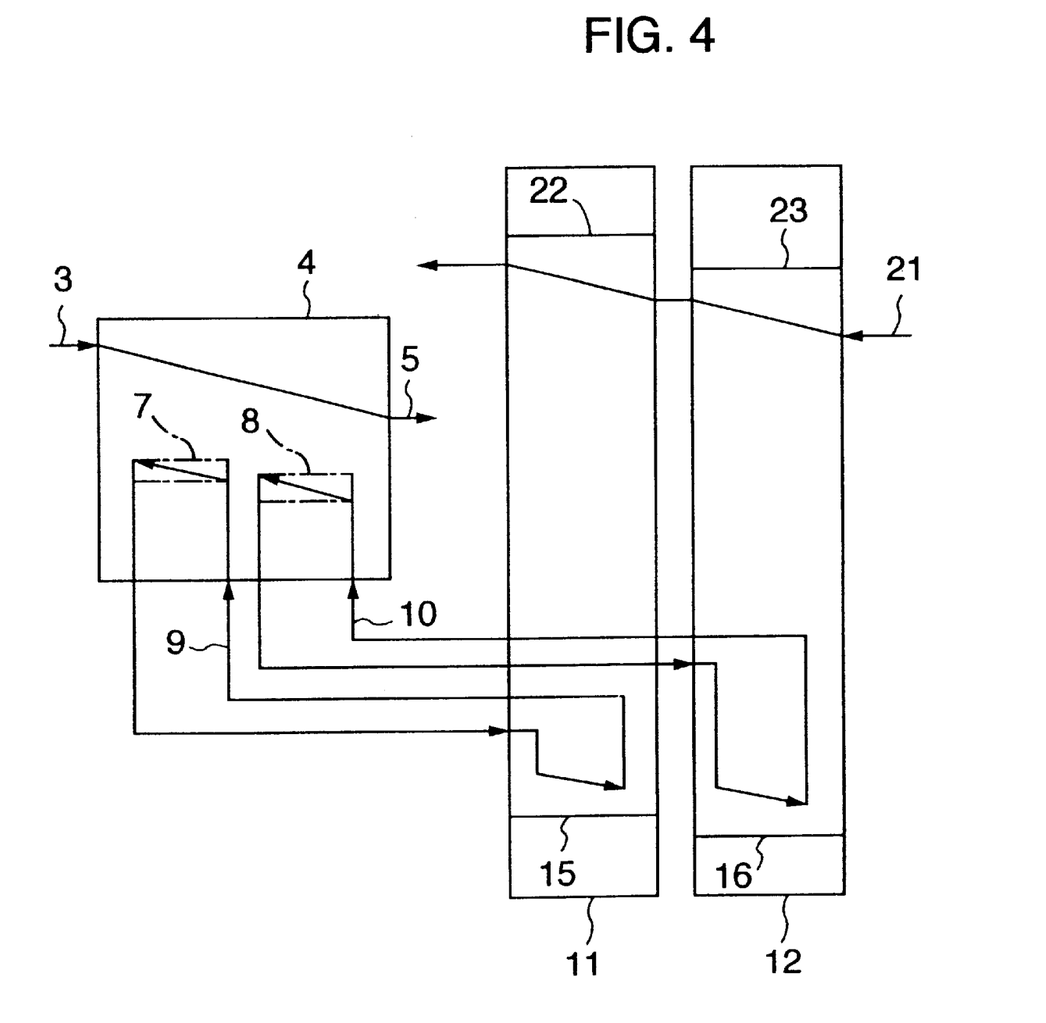
FIG. 4 is a diagram showing temperature conditions of the embodiment of FIG. 3.

FIG. 4 shows temperature conditions within the suction air cooler 4 and the absorption chillers 11 and 12.

The coil within the suction air cooler 4 is divided into the two lines, and by doing so, the heat exchange between the air and the chilled water is effected in a counterflow manner, and therefore the overall construction of the coil can be made small. And besides, the air-cooling chilled water 9 and the air-cooling chilled water 10, supplied respectively from the absorption chillers 11 and 12 connected respectively to the coils 7 and 8 disposed close respectively to the outside air 3 and the suction air 5 of the gas turbine, are combined with the chilled water 21 for the chillers in a counterflow manner, and with this construction, a temperature difference between an evaporation temperature 15 and a condensation temperature 22 in the absorption chiller 11 is equal to a temperature difference between an evaporation temperature 16 and a condensation temperature 23 in the absorption chiller 12, and the heat exchange can be effected without any waste. Therefore, the overall size of the chiller can be made small, and the efficiency thereof can be further enhanced.

Next, a third embodiment of the invention will be described with reference to FIGS. 5 and 6.

Figure 5:
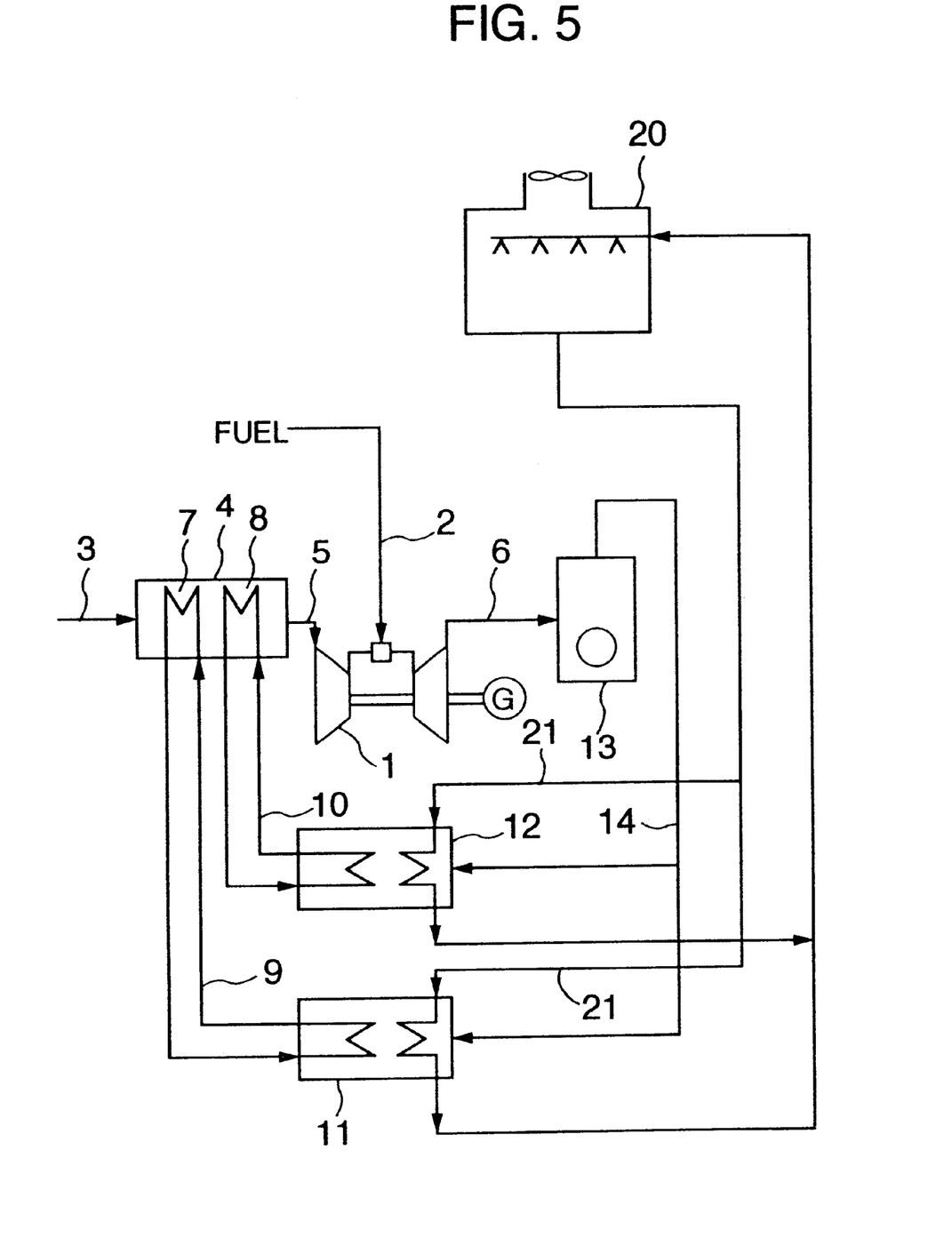
FIG. 5 is a system diagram of a gas turbine suction air cooling system according to a third embodiment of the invention.

FIG. 5 is an overall system diagram of a gas turbine suction air cooling system. Fuel 2 is supplied to a gas turbine 1, and the outside air 3 is drawn into a suction air cooler 4. The cooled air 5, decreased in temperature when passed through the suction air cooler 4, assists in the combustion of the fuel 2, and becomes combustion exhaust gas 6. An internal coil of the suction air cooler 4 is divided into two lines or circuits, and an absorption chiller 11 for supplying higher-temperature cooling chilled water 9, for example, of 9° C. is connected to the coil 7 disposed close to the outside air 3, whereas an absorption chiller 12 for supplying lower-temperature cooling chilled water 10, for example, of 6° C. is connected to the coil 8 disposed close to the suction air 5 of the gas turbine.

The exhaust gas 6 from the gas turbine 1 is fed to a waste heat boiler 13, and steam 14, produced in the boiler 13, is used as a drive source for the absorption chillers 11 and 12. Cooling water 21 for the chillers, decreased in temperature when passed through a cooling tower 20, is fed in parallel to the two absorption chillers 1 and 12.

Figure 6:
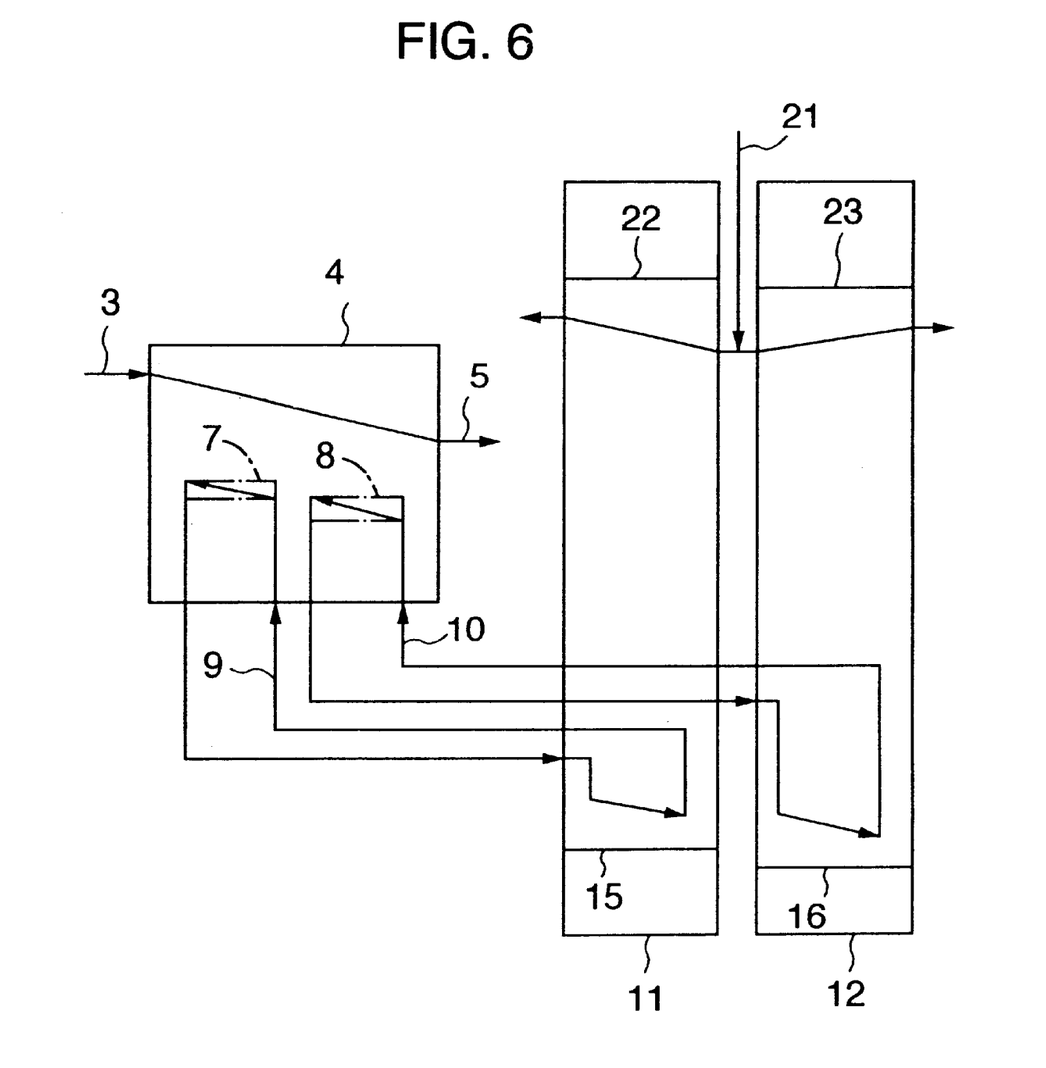
FIG. 6 is a diagram showing temperature conditions of the embodiment of FIG. 5.

FIG. 6 shows temperature conditions within the suction air cooler 4 and the absorption chillers 11 and 12.

The coil within the suction air cooler 4 is divided into the two lines, and by doing so, the heat exchange between the air and the chilled water is effected in a counterflow manner, and therefore the overall construction of the coil can be made small. And besides, a temperature difference between an evaporation temperature 15 and a condensation temperature 22 in the absorption chiller 11, connected to the coil 7 disposed close to the outside air 5, is smaller than a temperature difference between an evaporation temperature 16 and a condensation temperature 23 in the absorption chiller 12 connected to the coil 8 disposed close to the suction air 5 of the gas turbine 1, and therefore the efficiency is enhanced.

Figure 7:
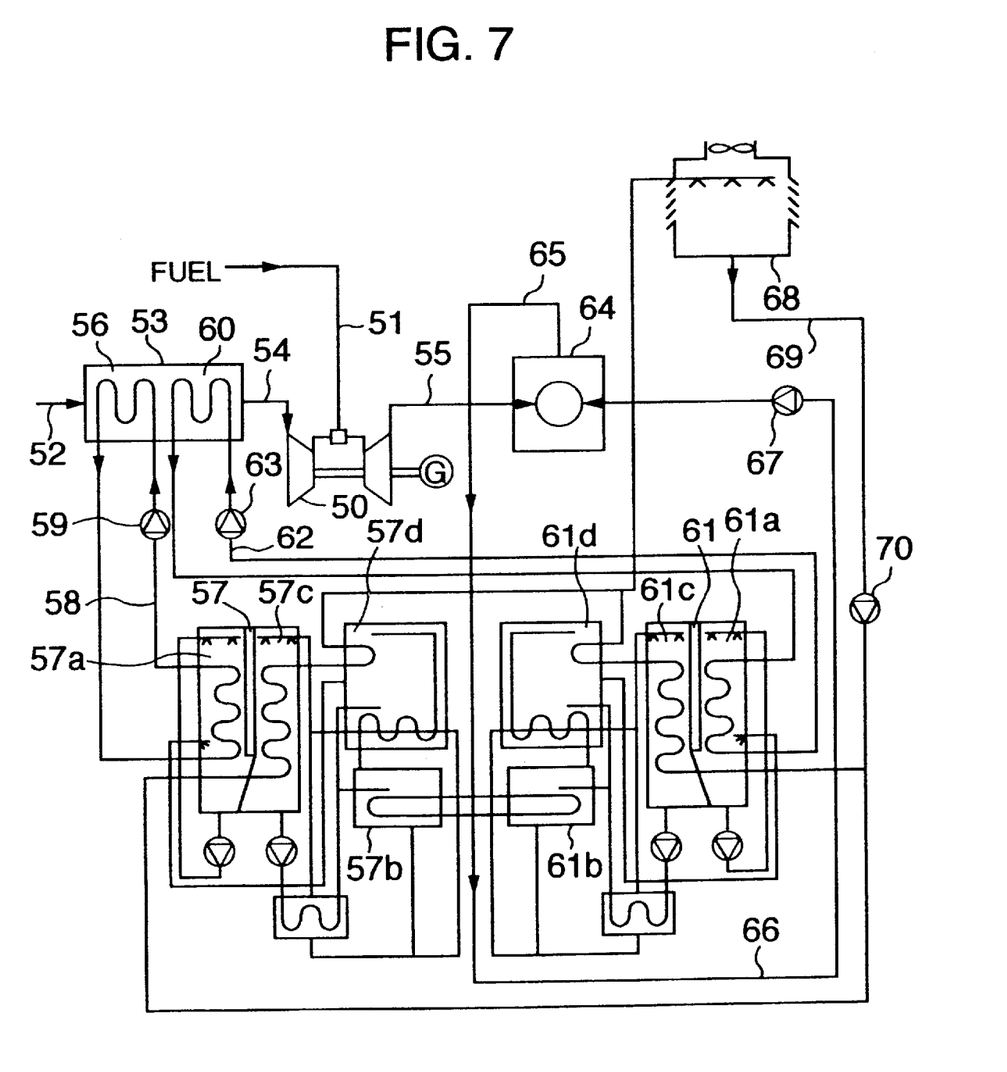
FIG. 7 is a system diagram of a gas turbine suction air cooling system incorporating absorption chillers according to the other embodiment of the invention.

FIG. 7 is an overall system diagram of a gas turbine suction air cooling system incorporating dual-effect absorption chillers. A line for supplying fuel 51, a line for feeding cooled air 54 which is decreased in temperature when passed through a suction air cooler 53, and a line for feeding combustion exhaust gas 55 are connected to a gas turbine 50.

An internal coil of the suction air cooler 53 is divided into two lines, and cooling chilled water 58, cooled, for example, to 9° C. by an evaporator 57a of an absorption chiller 57, is supplied by a pump 59 to the coil 56 disposed close to the outside air 52, and this cooling chilled water 58, when passing through the coil 56, absorbs heat from the outside air to be increased in temperature, and then is returned to the absorption chiller 57.

On the other hand, cooling chilled water 62, cooled, for example, to 6° C. by an evaporator 61a of an absorption chiller 61, is supplied by a pump 63 to the coil 60 disposed close to the suction air 54 of the gas turbine, and this cooling chilled water 62, when passing through the coil 60, absorbs heat from the outside air to be increased in temperature, and then is returned to the absorption chiller 61.

The exhaust gas 55 from the gas turbine 50 is fed to a waste heat boiler 64, and steam 65, produced in this boiler 64, is supplied to a high-temperature generator 57b of the absorption chiller 57 and a high-temperature generator 61b of the absorption chiller 61, and is condensed into drain water 66 in the high-temperature generators 57b and 61b, and is returned to the boiler 64 by a pump 67.

Cooling water 69 for the chillers, cooled in a cooling tower 68, is supplied by a pump 70 to an absorber 57c and a condenser 57d of the absorption chiller 57 and to an absorber 61c and a condenser 61d of the absorption chiller 61, and absorbs heat from the chillers to be increased in temperature, and then is returned to the cooling tower 68.

In this embodiment, the suction air cooler can be reduced into a small size, and therefore, the absorption chillers for supplying the cooling chilled water to the suction air cooler can be reduced into a small size. And besides, the high efficiency of the absorption chillers can be achieved.

Furthermore, the chiller for supplying the cooling chilled water to the suction air cooler is divided into a plurality of lines, and even if one of the chillers is subjected to malfunction, the air-cooling ability will not be totally lost.

Furthermore, one of the chillers can be selectively operated depending on the temperature of the outside air, and by doing so, the system can be operated, using a half of the power required for operating the auxiliary apparatus of the chillers.

What is claimed is:

1. A gas turbine suction air cooling system, comprising:

a gas turbine;

a suction air cooler connected to the gas turbine for cooling outside air to be drawn into the gas turbine, the suction air cooler including a first coil disposed closest to the outside air and a second coil disposed closest to the gas turbine;

a first absorption chiller connected to the first coil for feeding chilled water of a first temperature to the first coil;

a second absorption chiller connected to the second coil for feeding chilled water of a second temperature to the second coil, the first temperature being higher than the second temperature;

a cooling tower for supplying cooling chilled water; and conduits for feeding cooling chilled water from the cooling tower in series to the second absorption chiller and then to the first absorption chiller.

* * * * *